United States Patent [19]

Candy

[11] Patent Number: 5,506,506
[45] Date of Patent: Apr. 9, 1996

[54] METAL DETECTOR FOR DETECTING AND DISCRIMINATING BETWEEN FERROUS AND NON-FERROUS TARGETS IN GROUND

[75] Inventor: Bruce H. Candy, Basket Range, Australia

[73] Assignee: Halcro Nominees Pty Ltd., Glenside, Australia

[21] Appl. No.: 3,470

[22] Filed: Jan. 12, 1993

[30] Foreign Application Priority Data

Jan. 14, 1992 [AU] Australia .................... PL0404

[51] Int. Cl.$^6$ .............. G01V 3/08; G01V 3/10; G01N 27/72; G01R 33/12
[52] U.S. Cl. ................................ 324/329; 324/232
[58] Field of Search .................... 324/326–329, 324/331, 334–337, 344, 345, 232, 236, 239, 67

[56] References Cited

U.S. PATENT DOCUMENTS

| | | |
|---|---|---|
| 4,110,679 | 8/1978 | Payne . |
| 4,128,803 | 12/1978 | Payne . |
| 4,249,128 | 3/1981 | Karbowski ........................... 324/329 |
| 4,325,027 | 4/1982 | Dykstra et al. ..................... 324/329 |
| 4,486,713 | 12/1984 | Gifford ................................. 324/329 |
| 4,628,265 | 12/1986 | Johnson et al. ..................... 324/329 |
| 4,677,384 | 6/1987 | Payne ................................... 324/329 |
| 4,700,139 | 11/1987 | Podhrasky ............................ 324/329 |
| 4,709,213 | 11/1987 | Podhrasky ............................ 324/329 |
| 4,783,630 | 11/1988 | Shoemaker ........................... 324/329 |
| 4,868,504 | 9/1989 | Johnson ................................ 324/329 |
| 4,894,618 | 1/1990 | Candy ................................... 324/329 |
| 4,942,360 | 7/1990 | Candy ................................... 324/329 |
| 4,975,646 | 12/1990 | LlamasLlamas et al. ......... 324/329 X |
| 5,039,946 | 8/1991 | Mamontov et al. ................. 324/329 |
| 5,047,718 | 9/1991 | Aittoniemi et al. ............. 324/329 X |

FOREIGN PATENT DOCUMENTS

| | | |
|---|---|---|
| 1350273 | 4/1974 | United Kingdom . |
| 2004069 | 3/1979 | United Kingdom . |

*Primary Examiner*—Sandra L. O'Shea
*Assistant Examiner*—Roger Phillips
*Attorney, Agent, or Firm*—Cushman Darby & Cushman

[57] ABSTRACT

A metal detector apparatus and a metal detection method for detecting and discriminatory interrogating a metal target buried in the ground. The detector includes a transmitter for providing a first varying magnetic field including at least two frequency components and a receiver for providing a resultant voltage dependent upon a second magnetic field resulting from the combined effects of the ground and metal targets buried in the ground, upon the first alternating magnetic field. The detector samples at least three voltage measurements of the resultant voltage over three different time periods to provide three sampled values which are then processed by a microprocessor to provide three average ground balanced signals from which at least two ratios are calculated and compared against a pre-defined response. The method of detecting and discriminating between metal targets includes providing a first varying magnetic field having at least two frequency components and receiving a resultant voltage dependent upon a second magnetic field resulting from the combined effects of the ground and metal targets buried in the ground, upon the first alternating magnetic field. The resultant voltage is sampled and processed over three different time periods to provide three average ground balanced signals from which at least two ratios are calculated and compared against a predefined response. This comparison is used to distinguish between ferrous and non-ferrous metals.

12 Claims, 4 Drawing Sheets

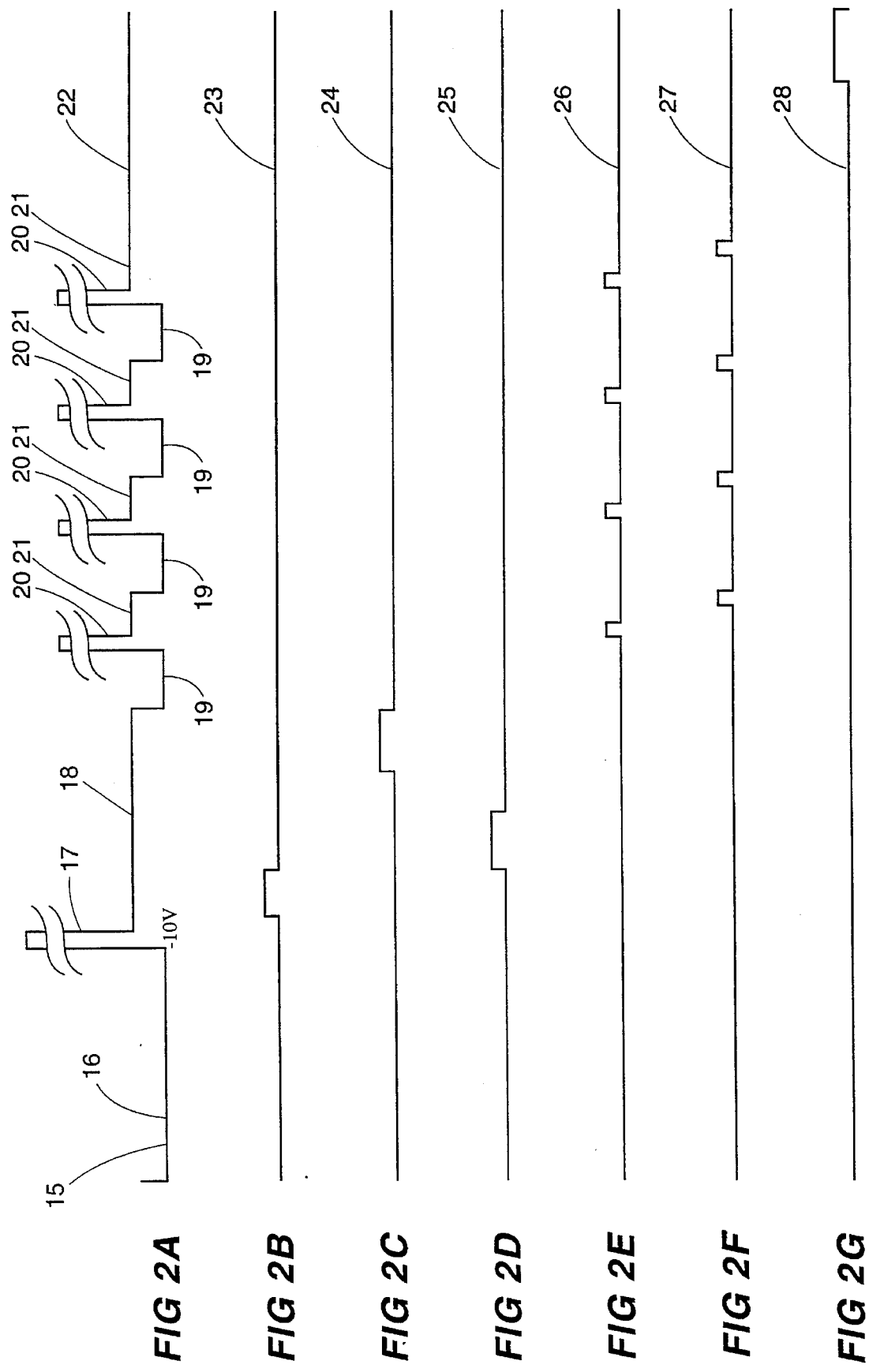

METAL DETECTOR FOR DETECTING AND DISCRIMINATING BETWEEN FERROUS AND NON-FERROUS TARGETS IN GROUND

BACKGROUND OF THE INVENTION

This invention relates to an apparatus and method for discriminating between ferrous and non-ferrous metal targets.

Traditionally there are two types of metal detectors both of which illuminate the ground with a magnetic signal, namely:

Type 1. One type is used for gold recovery which supplies an audio signal to the user which is modulated by ground minerals and usually all conducting metals. The ground signals give a continuous relatively slow varying background signal. Gold gives a shorter transient signal. Hence, the operator has to try to notice subtle differences in the transients of the audio signal to assess whether a gold nugget is being interrogated. The interfering background minerals adversely affect the depth to which these gold nuggets may be located. Art in four patents namely U.S. Pat. Nos. 4,942,360, 4,894,618, U.S. patent application Ser. No. 07/468,471, filed Jan. 12, 1990 (abandoned) and U.S. patent application Ser. No. 07/501,106, filed Mar. 29, 1990 (abandoned) describe means of overcoming the above difficulties.

Type 2. The second type of detector is more common and is used to locate valued man made artefacts amongst non-valuable metals, eg. coins and jewellery amongst rusty iron and beverage can pull-tabs. This is possible because the different metals have different magnetic properties in the case of iron versus non-iron, and specific electrical conductivities in the cases of non-iron junk such as aluminium pull-tabs compared to coins. These detectors usually only produce an audio signal when a potentially valuable non-iron object type of signal is being detected. It should be noted that most patents in this field relate to this type of metal detector.

This invention relates to the second type of detector. In particular, it relates to the differentiation between iron and non-iron objects buried in iron oxide mineralised ground; the most common type of interfering mineral. When applying an alternating magnetic field to an environment, such as a volume of ground containing a target, the environment is modified in three different ways, these being:

1) by the generation of a magnetic field which depends only on the history of the applied magnetic field resulting from energy dissipated from the applied field, 2) by an instantaneous and direct enhancing of the applied field known as ferro-magnetism or ferri-magnetism, 3) by an instantaneous and direct opposing of the applied field known as dia-magnetism.

There is no energy dissipated from the applied field in ferro-magnetism, ferri-magnetism or dia-magnetism.

When measuring the above environment modifications the component of the resulting signal which depends upon the history of the applied magnetic field is known as the loss component because energy is dissipated. When referring to applied sinusoidally varying magnetic fields this loss component is known as the resistive component.

When measuring the ferro-magnetism, ferri-magnetism or dia-magnetism components, the resulting signal is known as the purely magnetic component. When referring to applied sinusoidally varying magnetic fields this component is known as the reactive component. It should be noted that dia-magnetic component is opposite in sign to the ferro-magnetism or ferri-magnetism component. Hence, the dia-magnetic component can be considered as a "negative" purely magnetic component.

A limitation with traditional detectors is that they endeavour to measure the ferro-magnetic properties of iron junk amongst a random background of magnetic iron oxides in the ground, in particular, haematite and magnetite. For deeply buried targets, the background signals are often much stronger than those of the metal target. Hence, even though it is possible to determine the presence of the metal target for the well known reasons given below, it is very difficult to determine whether a deeply buried target is iron or non-iron because of the interfering ground signals.

The apparatus in the following patents all measure the reactive component to determine whether a target is ferrous (ferro-magnetic, eg., iron) or non-ferrous (non-ferromagnetic, eg., silver, aluminium): GB 1,350273, U.S. Pat. Nos. 4,677,384, 4,677,384, 4,128,803, 4,249,128, 4,486,713, 4,700,139, 4,325,027. Most also have means to determine the conductive nature of the target so that further assessment can be made about the likely type of non-ferrous target being interrogated. This is so that aluminium foil or pull-tabs may be discriminated against. Other patents such as GB 2,004, 069, Pat. Nos. 4,628,265, and 4,942,669 describe forms of apparatus using ground balanced multiple frequencies to determine the conductive nature of non-ferrous targets more accurately without magnetic ground interference. Some of these cited patents, for example U.S. Pat. Nos. 4,677,384, 4,700,139 and 4,128,803 describe means of high-pass or band-pass filtering to reduce the effect of the relatively slow varying background ground signal while relatively enhancing the transient "point source" signal of metal targets, in order to reduce the effects of the ground reactive component contaminating the target signal reactive component, and hence substantially limiting discrimination accuracy. This filtering technique is used in almost all type 2 commercially available metal detectors. However, while this filtering technique is a significant improvement over no filtering, the discrimination depth in most grounds is still significantly reduced compared to the depth to which targets can be located without the ability to assess their ferrous/non-ferrous properties.

Patent specification U.S. Pat. No. 4,110,679 describes an apparatus that transmits a complex triangular current waveform. The apparatus transmits a high current pulse that produces a magnetic field strong enough to cause measurable hysteresis in iron targets. This powerful signal is followed by a period of non-transmission sufficiently long for eddy current in metal targets to become insignificantly small. Then a smaller or series of smaller pulses are transmitted in the opposite polar sense. During this transmission, the received signal is measured. As the iron targets partially "unsaturate" they produce a different signal relative to non-ferrous targets which of course have no magnetic hysteresis. The signal processing is arranged so that the processed received signal does not respond to the purely reactive component. However, this discrimination action only works satisfactorily in some ground areas and then only on targets that are not deeply buried it is the iron targets which saturate and not the magnetic ground. This is because the magnetic field decreases rapidly with increasing distance from the transmit coil.

All of the second type of metal detectors described above are required to distinguish between ferrous and non-ferrous targets. Typically, more than 95% of all metal buried in the ground is ferrous such as rusty nails, screws, "tin" cans, tacks and pieces of fencing wire. All commercial detectors achieve this discrimination by comparing both the measured loss component and the purely magnetic component in which their relative signs are fundamental to this discrimination. However, this comparison has limitations when assessing the nature of the target. These limitations occur owing to two reasons. Firstly, in large ferrous targets the eddy current time constant may be long and the dia-magnetic component of the eddy current may dominate the ferro-magnetic component and mask its presence. That is the dia-magnetic component may exceed the ferromagnetic component. Hence such long time constant eddy current ferrous targets are often incorrectly determined to be non-ferrous targets by all existing metal detectors. Secondly, for relatively deeply buried targets it is possible to measure the loss component in a substantially ground balanced channel (described below), but of the target signal magnetic component can be insignificant compared to that of the ground signal. Thus, it can be impossible to determine whether a deeply buried target in a ground area containing iron-oxide is ferrous or non-ferrous. As a result current metal detectors are relatively limited in discrimination search depth.

It is an object of this invention to overcome some of the above difficulties or at least provide the public with a useful alternative.

BRIEF SUMMARY OF THE INVENTION

In one form of this invention there is provided a metal detector for detecting and discriminating between ferrous and non-ferrous metal targets buried in the ground including:

- a transmission means for providing a first alternating magnetic field in an area of ground, the first alternating magnetic field containing at least two frequency components these being a first frequency component and a second frequency component such that the second frequency component's frequency is higher than the said first frequency component's frequency;
- a receiving means for providing a resultant voltage dependent upon a second magnetic field resulting from the effects of the ground, and the effects of targets buried in the ground, upon the first alternating magnetic field;
- a sampling means for sampling at least three voltage measurements of the resultant voltage over three different time periods to provide three sampled values, the sampling being synchronised to the first alternating magnetic field;
- a processing means for both processing the three sampled values to provide three average ground balanced signals and providing at least two ratios from the averaged ground balanced signals;
- a comparison means for comparing the at least two ratios against a pre-defined response; and
- an informing means responsive to the comparison means and adapted to provide an informing signal indicative of a possible location of any target of selected nonferrous character in response to any comparison resulting from the comparison means.

In preference, the comparison means is adapted to compare the two ratios against the pre-defined response, wherein the pre-defined response is within a selected ratio of a first order target response.

Alternatively, in another form of this invention there is meal detector for detecting and discriminating between ferrous and non-ferrous metal targets buried in the ground including:

- a electrical supply means for providing a voltage to a magnetic transmission means, the electrical supply means providing a first abrupt transition from a zero voltage to a substantially steady state voltage for a period of time after which the pulse generation means abruptly removes the substantially steady state voltage from the magnetic transmission means such that a resultant back electro motive force is produced such that the transmission means emits a first alternating magnetic field in an area of the ground;
- a receiving means for providing a resultant voltage dependent upon a second magnetic field resulting from the effects of the ground, and the effects of targets buried in the ground, upon the first alternating magnetic field;
- a sampling means for sampling at least three voltage measurements of the resultant voltage over three different time periods to provide three sampled values, the sampling being synchronised to the first alternating magnetic field;
- a processing means for both processing the three sampled values to provide three average ground balanced signals and providing at least two ratios from the averaged ground balanced signals;
- a comparison means for comparing the at least two ratios against a pre-defined response; and
- an informing means responsive to the comparison means and adapted to provide an informing signal indicative of a possible location of any target of selected nonferrous character in response to any comparison resulting from the comparison means.

In preference, the comparison means is adapted to compare the two ratios against the pre-defined response, wherein the pre-defined response is within a selected ratio of a first order target response.

In preference, the sampling means is adapted to sample at least one of the three sampled values shortly after the cessation of the resultant back electro motive force during which the resultant voltage contains relatively high frequency components.

Alternatively, in another form of this invention there is provided a metal detector for detecting and discriminating between ferrous and non-ferrous metal targets buried in the ground including:

- an electrical supply means for providing a voltage sequence of at least two different pulse periods to a magnetic transmission means, the pulse periods each consisting of a first abrupt transition from a zero voltage to a substantially steady state voltage for a the duration of the said period, after which the generation means abruptly removes the substantially steady state voltage from the magnetic transmission means which results in a resultant back electro motive force such that the transmission means emits a first alternating magnetic field in an area of the ground;
- a receiving means for providing a resultant voltage dependent upon a second magnetic field resulting from the effects of the ground, and the effects of targets buried in the ground, upon the first alternating magnetic field;
- a sampling means for sampling at least three voltage measurements of the resultant voltage over three different time periods to provide three sampled values, the sampling being synchronised to the first alternating magnetic field;
- a processing means for both processing the three sampled values to provide three average ground balanced signals and providing at least two ratios from the averaged ground balanced signals;

a comparison means for comparing the at least two ratios against a pre-defined response; and an informing means responsive to the comparison means and adapted to provide an informing signal indicative of a possible location of any target of selected nonferrous character in response to any comparison resulting from the comparison means.

In preference, the comparison means is adapted to compare the two ratios against the pre-defined response, wherein the pre-defined response is within a selected ratio of a first order target response.

In preference, the method is further characterised by the sampling including sampling of at least one of the three sampled values shortly after the cessation of one of the resultant back electro motive forces during which the resultant voltage contains relatively high frequency components.

Alternatively, in another form of this invention there is provided a method of detecting and discriminating between ferrous and non-ferrous metal targets buried in the ground including the steps of:

a transmission a first alternating magnetic field in an area of ground, the first alternating magnetic field containing at least two frequency components these being a first frequency component and a second frequency component such that the second frequency component's frequency is higher than the said first frequency component's frequency;

providing a resultant voltage dependent upon a second magnetic field resulting from the effects of the ground, and the effects of targets buried in the ground, upon the first alternating magnetic field;

sampling at least three voltage measurements of the resultant voltage over three different time periods to provide three sampled values, the sampling being synchronised to the first alternating magnetic field; and processing the three sampled values to provide three processed signals substantially independent of the effects of iron oxides in the ground, and providing at least two ratios from these three processed signals substantially independent of the effects of iron oxides;

comparing the at least two ratios against a pre-defined response; and producing an informing signal from an informing means responsive to the said comparison which will be indicative of a possible location of any target of selected nonferrous character.

In preference, the method is further characterised by the comparing including the comparing of the two ratios against the pre-defined response, wherein the pre-defined response is within a selected ratio of a first order target response.

Alternatively, in another form of this invention there is provided a method of detecting and discriminating between ferrous and non-ferrous metal targets buried in the ground including:

providing a voltage to a magnetic transmission means to provide a first abrupt transition from a zero voltage to a substantially steady state voltage for a period of time;

abruptly removing the substantially steady state voltage from the magnetic transmission means such that a resultant back electro motive force is produced such that the transmission means emits a first alternating magnetic field in an area of the ground;

providing a resultant voltage dependent upon a second magnetic field resulting from the effects of the ground, and the effects of targets buried in the ground, upon the first alternating magnetic field;

sampling at least three voltage measurements of the resultant voltage over three different time periods to provide three sampled values, the sampling being synchronised to the first alternating magnetic field; and processing the three sampled values to provide three processed signals substantially independent of the effects of iron oxides in the ground, and providing at least two ratios from these three processed signals substantially independent of the effects of iron oxides;

comparing the at least two ratios against a pre-defined response; and producing an informing signal from an informing means responsive to the said comparison which will be indicative of a possible location of any target of selected nonferrous character.

In preference, the method is further characterised by the comparing including a comparison of the two ratios against the pre-defined response, wherein the pre-defined response is within a selected ratio of a first order target response.

In preference, the method is further characterised by the sampling including the sampling of at least one of the three sampled values shortly after the cessation of the resultant back electro motive force during which the resultant voltage contains relatively high frequency components.

Alternatively, in another form of this invention there is provided a method of detecting and discriminating between ferrous and non-ferrous metal targets buried in the ground including:

providing a voltage sequence of at least two different pulse periods to a magnetic transmission means, the pulse periods each consisting of a first abrupt transition from a zero voltage to a substantially steady state voltage for a the duration of the said period, after which the generation means abruptly removes the substantially steady state voltage from the magnetic transmission means which results in a resultant back electro motive force such that the transmission means emits a first alternating magnetic field in an area of the ground;

providing a resultant voltage dependent upon a second magnetic field resulting from the effects of the ground, and the effects of targets buried in the ground, upon the first alternating magnetic field;

sampling at least three voltage measurements of the resultant voltage over three different time periods to provide three sampled values, the sampling being synchronised to the first alternating magnetic field;

processing the three sampled values to provide three processed signals substantially independent of the effects of iron oxides in the ground, and providing at least two ratios from these three processed signals substantially independent of the effects of iron oxides;

comparing the at least two ratios against a pre-defined response; and producing an informing signal from an informing means responsive to the said comparison which will be indicative of a possible location of any target of selected nonferrous character.

In preference, the method is further characterised by the comparing including a comparison of the two ratios against the pre-defined response, wherein the pre-defined response is within a selected ratio of a first order target response.

In preference, the method is further characterised by the sampling including sampling of at least one of the three sampled values shortly after the cessation of one of the resultant back electro motive forces during which the resultant voltage contains relatively high frequency components.

BRIEF DESCRIPTION OF THE DRAWINGS

For a better understanding of this invention, it will now be described with the assistance of diagrams in which:

FIGS. 2A–2G show a multi period transmission pulse induction waveform and sampling periods during non transmission;

DETAILED DESCRIPTION OF THE INVENTION

Figure 1A:
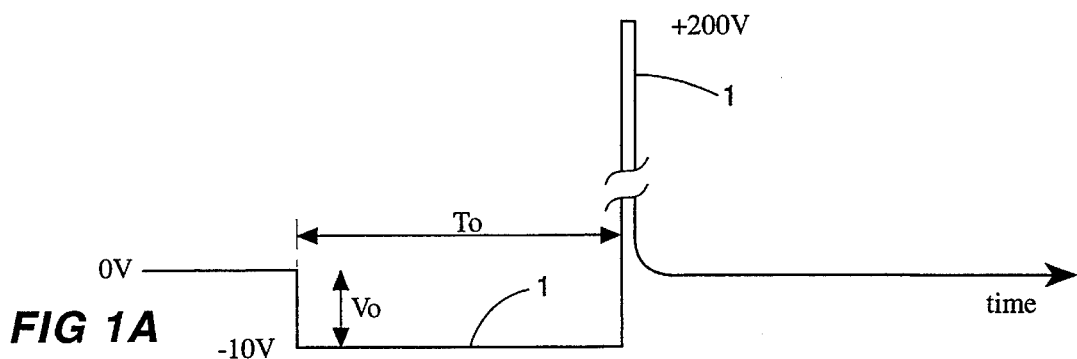
FIGS. 1A–1I show a typical set of waveforms used to implement the invention.

Any varying applied magnetic field induces eddy currents within electrically conducting metal targets. These in turn generate a magnetic field which tends to oppose the original applied field (dia-magnetic component). Hence, the eddy current field tends to cancel the applied field within the target. The eddy currents are driven by the rate of change of the transmitted interrogating magnetic field, but their instantaneous magnitude depends on the history of the applied field. This is because the eddy current produced magnetic field has its own associated stored energy (in other words self inductance) which in turn tends to conserve the eddy currents.

The eddy currents flowing through the target lose energy through the material resistance of the target. Hence, the eddy current generated magnetic field continually loses energy, and the energy gained from the transmitted field at any moment decays away progressively thereafter. As a result, even though the eddy currents tend to oppose the applied field, the material resistive energy loss does not allow the eddy current field to keep up with the applied field and cancel it, except in superconductors which have no energy loss. The eddy currents obey equations associated with a distributed inductance and distributed resistance throughout the metal target in which the driving energy source is dependent upon the rate of change of the inductively coupled transmitted field.

For simplicity it is easier to think in terms of the rate of change of the eddy current generated magnetic field as opposed to the eddy currents. This is because the actual measured signal is an induced a voltage in a receive coil which is directly proportional to the rate of change of the eddy current generated magnetic field. Thus the transmit coil and receive coil can be considered as a transformer such that the coupling is varied by the interrogated ground and targets. Hence, the eddy currents of conducting targets loosely couple the transmit coil to the receive coil via their distributed inductance and resistance.

At typical metal detector sinusoidal transmit frequencies (2–50 kHz) applied to inland grounds containing iron oxides, such as haematite and magnetite which are ferrimagnetic, the reactive to resistive ratios is of the order of 100: 1. The exception to this are some brackish damp grounds which are unusual inland, but are common on beaches. Hence, when these grounds are interrogated, as the metal detector transmit and receive coil assembly passes these ground the resulting varying received signal substantially depends on a signal proportional to the transmit signal owing to the purely magnetic component, whereas only a small percentage is related to a signal dependent on the history of the applied field. Most of this latter small signal component results from energy losses in changing the magnetic fields in the iron oxides, and typically only a small fraction of this small loss signal is due to eddy currents flowing in the ground.

In all type 1 detectors described above and most type 2 detectors there are received process signals called average ground balanced channel signals. These channels use synchronous demodulators with reference phases selected to cancel the purely magnetic signal but not the loss component. The synchronous demodulator is followed by a low-pass filter and then usually high-pass filters. Therefore, it is possible to substantially cancel out the predominant ground signal, viz. the purely magnetic signal whilst still being able to detect the presence of a metal target.

In this specification, the term average ground balanced signal refers to the averaged synchronous demodulated received signal. This signal is substantially zero when interrogating the ground, containing iron oxides, in the absence of metal targets. However this signal will not cancel small eddy current resistive signals arising from metal targets even though the ground's reactive signal may be very much larger than the small eddy current resistive signals.

In the best of the existing metal detectors the interfering magnetic component from the ground is relatively reduced by high-pass filtering. This takes advantage of the fact that the concentration of ferro-magnetism in grounds typically varies slowly spatially compared to the signal from metal targets as these are essentially transitory point sources compared to the bulk distribution of the ground. However, this is only a partial solution as the ground effects can still be far greater then the target's purely magnetic component.

In most existing metal detectors the transmit signal is a single frequency sine wave. This detectors therefore can only essentially measure the variables resistive and reactive components of the received signals. Hence, the purely magnetic component of the ground will necessarily affect discrimination. Consequently, in order to measure at least two components independent of the ground's purely magnetic component it is necessary to transmit more than one frequency. This can be achieved by transmitting either two or more sinusoidal frequencies or transmitting complex waveforms such as a pulse.

The well-known pulse induction transmit signal shape is a voltage of the order of 10 V applied to the transmit coil for a period of the order of a millisecond. This is followed by a very brief, very large back e.m.f. signal in the opposite polar sense of the order of 100 V such that at the end of the said brief period the transmit coil current is zero after which a period of no transmission follows. Coins and many non-ferrous targets behave approximately as a first order inductive/resistive circuit at frequencies below 100 kHz, that is they behave like an inductance (L henries) connected to a resistor (R ohms) with a time constant of L/R seconds. Hence, beside the magnitude of a signal received from such a target which depends on the distance of the target from the transmit and receive coil the received signal, due to a given transmit signal, has a response similar in shape to a first order response. For example, if a pulse induction transmit signal is applied to a non-ferrous coin, the received signal during transmission and following the large back e.m.f. pulse approximately obey the equations of first order L/R circuits.

Ferrous targets do not exhibit approximately first order responses when interrogated with alternating magnetic fields. For example, when using pulse induction the initial voltage applied to the transmit coil (of the order of 10 V for a period of the order of 1ms), the received signal is approximately that of a first order L/R object with an offset due to the ferri-magnetic nature of the target. However, this offset is effectively arbitrary as ground components due to iron oxides can give similar offsets which can be far larger and are unpredictable. The received signal following shortly after the large back e.m.f. transmit pulse has a substantially different response to that corresponding to a first order L/R network. In fact the received waveform can be described by a distributed high order network.

Referring to FIG. 1A in which waveform 1 is the transmit voltage. As drawn, the voltage starts at zero volts, then is held at Vo=−10 volts for a period of To =¼ of a millisecond. During this period the current in the transmit coil increases from zero approximately linearly. This approximation assumes the transmit coil Q is reasonably high at frequencies about 2 kHz (eg. Q >5). In fact, the increase decays exponentially away from the linear according to the transmit coil inductive/resistive time constant. At the end of the said period, the voltage clamp to −10 V is released and the stored magnetic energy is discharged in the resulting back e.m.f. When the current reaches zero, that is when the stored magnetic energy is discharged, the transmit coil voltage returns to 0 V. For example, if the back e.m.f. is +200 V the period taken to discharge the transmit current is a little less than 10 V/200 V ×0.25 milliseconds =12.5 microseconds, in other words a very short period.

Figure 1B:
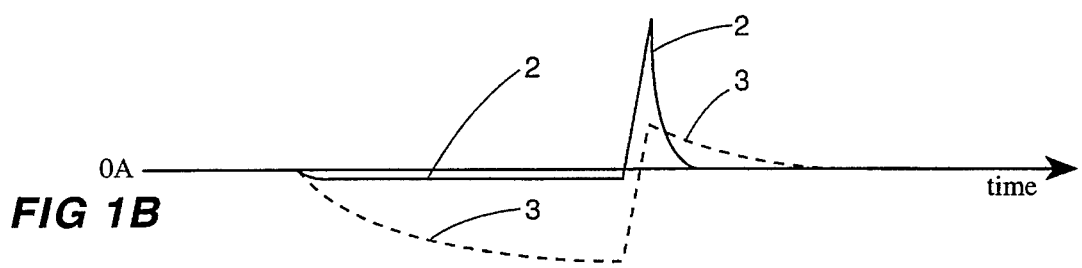

Any voltage waveform with abrupt transitions such as waveform 1 can be represented as an infinite series of sinusoidal signals according to Fourier analysis. Thus a pulse induction waveform such as waveform 1 is particularly useful for transmitting a wide range of similar strength frequency components. The transmission of a wide range of similar strength frequency components is desirable, as described below, in ferrous and non-ferrous discrimination. However, this form of transmission is very rarely used for discrimination. The waveforms 2 and 3 of FIG. 1B illustrate the received signals from two first order targets with a short time constant and a medium to long time constant respectively. These waveform magnitudes are arbitrary but their shape is dependent upon the target time constant. Waveform 2 is the effective eddy current flowing in the short time constant target. Note that during transmission the value of the current is approximately constant except for a short period following the commencement of transmission. This is because the relative energy loss is so fast that an equilibrium is rapidly set up between the energy loss rate and the eddy current source, namely the linearly increasing magnetic field. Waveform 3 is the effective eddy current flowing in the longer time constant target. Note that during transmission the current continually increases but the rate of increase progressively decreases.

In the mathematical analysis which follows, it is assumed that the intrinsic time constant of the transmit coil is infinite and the time constant of the receive coil is infinitesimal. Furthermore, it is assumed that the dynamic clamped voltage sources have zero dynamic impedance. Also it is assumed that the receive electronics has an infinite bandwidth. These assumptions are in reality not unreasonable for demonstrating the relevant concepts. The real parameters, such as finite transmit coil and drive electronics resistance, alter the shape of both waveforms in a similar manner, however their relative underlying trends are substantially unaltered. For example, during transmission the trends of both the waveforms 2 and 3 have lower rates of change near the end of To. It the relativities of these trends that are relevant to the principal differences between ferrous and non-ferrous targets. With the above assumptions the waveforms 2 and 3 both obey the equation $$i=k(1-\exp(-R/L*t))  \quad [1]$$

Here i is the said principal eddy current, k is a constant, t is time referenced to the commencement of transmission, R and L are the respective effective resistance and inductance of the first order targets which have a time constant equal to L/R.

In the case of waveform 2 R/L is relatively high in value, and the exponential exp(−R/L*t) rapidly approaches 0 with time. Hence as shown by waveform 2 i is constant after a short period following the commencement of transmission in which:

$$i=k \quad [2]$$

In the case of waveform 3 R/L is relatively low in value and the non linear part of the waveform occurs for a longer duration of time. In this example k is a different value and thus its magnitude during To is greater than that of waveform 2.

As the transmit coil energy discharge period is very rapid, the resulting induced eddy currents during this period have little time to partially discharge, that is, exp(−R/L*t) does not approximately equal 0 at the end of the period for either target where t is referenced to the commencement of the discharge period. As the rate of change of the transmit current is very large during this period, the induced eddy currents are large. As shown, these approximately add linearly to the terminal eddy currents flowing in the target at the end of the −10 V clamp period. As a result, at the end of this period, the net eddy current flowing in the short time constant target is relatively large compared to the long time constant target.

Figure 1C:
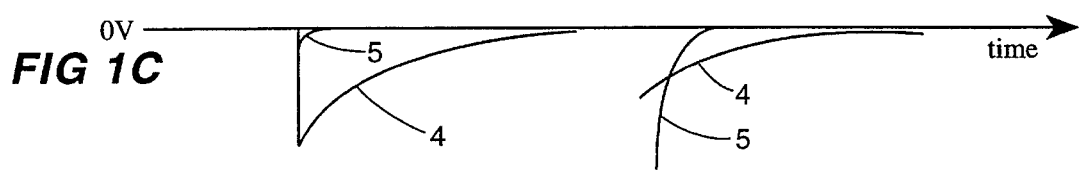
Figure 1D:
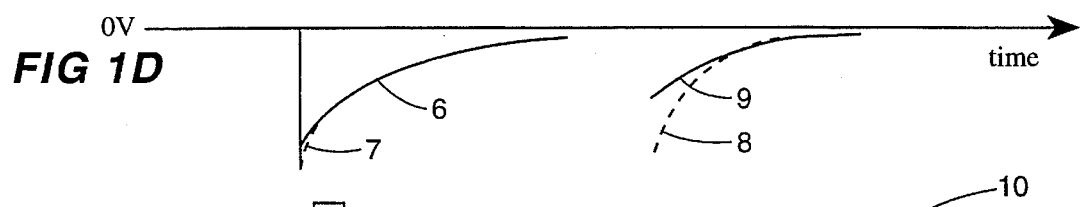
Figure 1E:
Figure 1F:
Figure 1G:

The resulting received voltage waveforms are the derivatives of the eddy currents multiplied by constants which depend on both of the target distance from the receive and transmit coils and the effective inductance of the target. FIG. 1C, the waveforms 5 and 4 are shown for the short and long time constant targets respectively. Note in this example there are substantially large difference in amplitude between the signal from the short and long time constant target during transmission. In contrast, note the similar amplitude between the two targets following the cessation of transmission.

Assuming the transmit coil energy discharge period is effectively infinitesimal, the short time constant waveform following the cessation of transmission is approximately $$v=k*To*\exp(-R/L*t),$$

and for the long time constant target the waveform is approximately $$v=k*L/R*[1-\exp(-R/L*To)-R/L*To]*\exp(-R/L*t),$$

which for very long time constant targets is approximately $$v=k*To*To*R/L*\exp(-R/L*t).$$

In summary, targets with time constants short relative to produce a relatively small response during the −10 V period but a relatively large signal following the cessation of transmission. In contrast, targets with time constants comparable with To (or longer) produce a relatively large response during the −10 V period but a relatively small signal following the cessation of transmission.

Thus if two targets are interrogated simultaneously, one with a short and one with a long time constant such that the received signals for each are comparable in amplitude following the cessation of transmission, then the waveform during the −10 V period is substantially the same as that of the long time constant target alone. If a single target cannot be represented reasonably accurately as a first order target but may be represented accurately as a higher order target with a predominant slow time constant component and minor fast time constant component, then the same situation would apply: Namely, the slow time constant component will dominate during the application of the −10 V transmission coil energy charging period whereas both the components will be reasonably manifest following the cessation of transmission. This is the case for ferrous targets.

The reason why there is a difference between ferrous and non-ferrous targets lies principally in the relationship between the internal local effective permeability distribution of iron targets and the eddy currents. Iron is a relatively poor conductor of electricity compared to the metals found in many typical buried non-ferrous targets such as coins, especially gold coins and aluminium. However, from the predominant eddy current time constant point of view, the effective inductance is high in ferrous targets because of the magnetic field enhancing properties of the iron. Thus, if an iron target is electromagnetically modelled approximately as a first order inductive resistive circuit, the resistance may be relatively large, but the inductance is also large. Hence the time constant is long relative to non-ferrous targets of similar size and shape with the same material resistivity. However, in metal iron targets not all the eddy currents flow within the predominant path. The current is also distributed to periphery areas which are not well magnetically coupled to the predominant current regions. For these currents, the high iron resistance and low inductance because of poor magnetic coupling result in a high R/L value. Consequently, iron targets are all represented as higher order targets far more accurately than first order targets, whereas most commonly buried valuable non-ferrous are reasonably well represented as first order targets (at frequencies below 100 kHz).

Figure 1H:
Figure 1I:

The received signal is shown for both ferrous and non-ferrous objects which have substantially the same time constant during the transmission period (the 0.25 ms period). The waveform is shown in FIG. 1A by 6 and 7 for a very similar slow time constant target. The difference between 6 and 7 is actually exaggerated— it is even smaller than that shown. Note that the arbitrary off-set due to the magnetic properties has been chosen so that the waveforms of both the ferrous and non-ferrous targets are coincident. This offset relative to 0 V is arbitrary because it is essentially defined by the magnetic ground and not the magnetic properties of the target for deeply buried targets. During the period of non-transmission, the ferrous and non-ferrous targets give significantly different waveforms owing to the essentially higher order properties of the ferrous target. The ferrous targets produce a larger faster initial time decay immediately following the cessation of transmission, which is shown in the initial portion of waveform 8, compared to the slower decaying smaller initial signal from the non-ferrous target as shown by 9. After this short period, the signal of the non-ferrous target may slightly exceed that of the ferrous target, thereafter the two signals are similar in magnitude. If the receive signal is sampled and averaged during the initial period following the cessation of transmission (ie during the high period shown in FIG. 1H in waveform 13) and this is subtracted from an averaged signal sampled during the high period of waveform 14, of FIG. 1I then the result will be quite different for ferrous and non-ferrous targets with a similar decay time constant during the −10 V transmission.

A comparison between the receive signal during transmission and during the period following the cessation of transmission will reveal whether the target is ferrous or not. According to Fourier analysis during the −10 V transmission period only the low and medium frequency components are significant, whereas shortly after the back e.m.f. pulse all frequency components are significant. The low and medium frequency components correspond to the long and medium time constant components respectively, and the high frequency component corresponds to the short time constant component.

In one form of the invention at least three different ground balanced signals are compared with at least one ground balanced signal being derived from signals sampled and averaged shortly after the cessation of the back e.m.f. Using these ground balanced signals, it is possible to determine whether the target is ferrous or not without significant interference from ground iron oxides. One of these averaged ground balanced signals is derived from a first difference signal obtained by subtraction of the receive signal obtained during a short period following very shortly after the cessation of transmission, and a signal obtained during a period a little later.

An example of selecting averaged ground balanced signal, the first averaged ground balanced signal may be obtained by sampling and averaging the received signal during the high period of waveform 10, and subtracting from this a selected proportion of a signal obtained by sampling and averaging the received signal during the high period of waveform 12. The selected proportion is selected such that the resultant difference results in a substantial null to the interrogation of magnetic grounds (i.e the arbitrary offset).

Similarly, a second averaged ground balanced signal may be obtained by sampling and averaging the received signal during the high period of waveform 11, and subtracting from this a selected proportion of a signal obtained by sampling and averaging the received signal during the high period of waveform 12.

As the purely magnetic component is only dependent on the instantaneous transmitted magnetic field, this is not present during the period of non-transmission. All sampled received signals taken during the non transmission period will be relatively independent of the effects of the ground. Thus the linear combination of the said averaged sampled signal obtained during the high periods of waveforms 13 and 14 may be the third averaged ground balanced signal.

Given all the sampled period times, the transmit coil time constant and the value of To, it is possible to calculate or determine empirically the relationship between all three averaged ground balanced channels for first order targets. This relationship must include a comparison of at least two ratios derived from the averaged ground balanced signals. For example, this comparison could be the third averaged ground balanced signal divided by the second averaged ground balanced signal, and the first averaged ground balanced signal divided by the second averaged ground balanced signal.

The measured results can be compared to the theoretical prediction, and if the results differ by more than a selected proportion, then the target may be deemed to be ferrous as opposed to non-ferrous. In order to minimise the effects of the ground and to determine whether a target is ferrous or non-ferrous it is necessary to obtain at least three averaged ground balanced signals. The ratios between these three signals indicates whether the target is approximately a first order target (non-ferrous) or a higher order target (ferrous).

In another form of this invention the decaying signal following the cessation of a transmit pulse, such as curve 8 or 9, are analysed to determine whether the decay results from an approximate first order target or higher orders. For example, consider the waveforms shown in FIGS. 2A–2G in which the transmit signal is shown by waveform 15. First there is a long transmit pulse 16 followed by a short large back e.m.f. coil discharge pulse 17. This is followed by a period of non-transmission 18 and then there is a period of transmission 19 of shorter duration than the transmit pulse 16. This is followed by a short time duration large back e.m.f. transmit coil discharge pulse 20 and then a period of non-transmission 21. The sequence 19-20-21 is repeated several times (a total of 4 is shown). Thereafter, a long period of non-transmission 22 follows and the whole sequence may continually cyclically repeat.

Waveforms 23 to 28 show periods of receiving, synchronous demodulation and averaging (active when waveforms are of high level). None of these signals are derived during periods of transmission unlike the preceding example of FIGS. 1A–1I. Waveform 23 shows a period of receiving and averaging following relatively shortly after the cessation of transmission of the long transmit pulse 16. During this period, the received waveform will be relatively sensitive to components from both medium and long time constant components. Waveform 24 shows a period of reception and averaging near the end of 18. This period is only sensitive to signals arising from long time constant components. If this averaged signal is subtracted from the averaged signal derived during period 23 then the final signal (or medium time constant channel) will be sensitive principally to medium time constant components.

Waveform 25 shows a period of receiving and averaging following a relatively long delay after the cessation of transmission of the long transmit pulse 15. During this period, the received waveform will be relatively sensitive to mainly long time constant components. Waveform 28 shows a period of reception and averaging near the end of 22. This period will contain no significant signals but serves to cancel out asynchronous background signals. If this averaged signal subtracted from the averaged signal derived during period 25, then the final signal (or long time constant channel) will be sensitive to principally long time constant components.

Waveform 26 shows a period of receiving and averaging following very shortly after the cessation of transmission of each short transmit pulse 19. During this period the received waveform will be relatively sensitive to both medium and short time constant components. Waveform 27 shows a period of reception and averaging near the end of each period 21. This period predominantly sensitive to medium time constant components. If this averaged signal is subtracted from the averaged signal derived during period 26 then the final signal (or short time constant channel) will be principally sensitive to short time constant components.

Hence the resultant three different averaged synchronously demodulated components will be predominantly sensitive to short, medium and long time constant responses respectively. Data from a detector using the waveforms illustrated in FIGS. 2A–2G is given in the graph of FIG. 3. The horizontal axis is the natural logarithm of the ratio between the measured response from the long time constant channel and medium time constant channel. The vertical axis is the negative of the natural logarithm of the ratio between the measured response from the short time constant channel and medium time constant channel. The dots are for ferrous targets, consisting of flat iron, nails, screws, bolts, nuts, washes, ferrous wire, ferrous coins, bottle tops and tools. Some of these measurements are for the same target but with a different orientation to give the most different measurement. The crosses are values for non-ferrous targets, mainly coins, but with a few non coins such as a brass nuts, a brass screw and an aluminium pull-tab.

Figure 3:
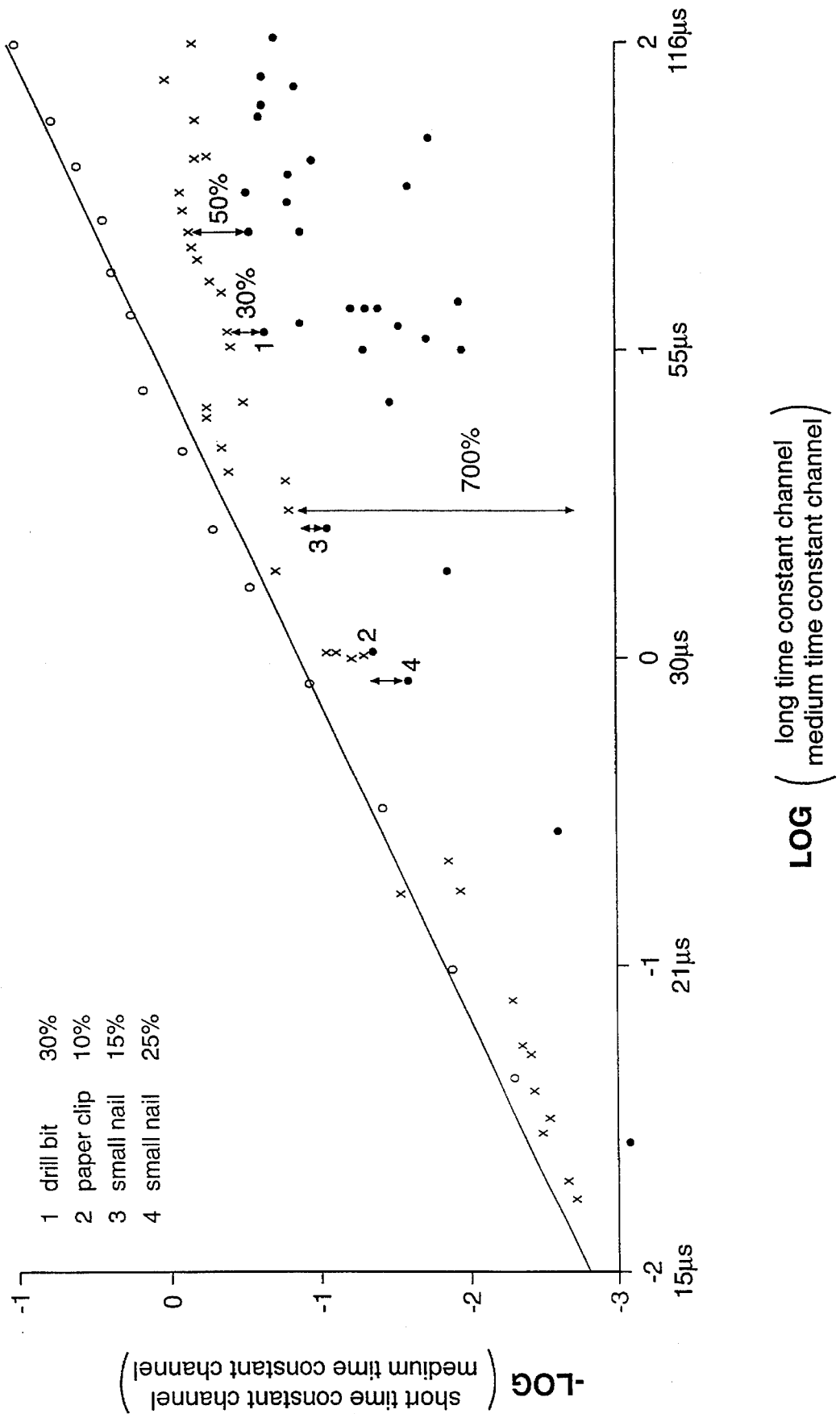
FIG. 3 shows a graph of ferrous and non ferrous targets measured using an apparatus that uses the waveforms of FIGS. 2A–2G.

The straight line illustrated in FIG. 3 is the approximate response for theoretical first order targets and the open circles are measured responses from a coil connected to a resistance with a time constant also shown on the horizontal axis (an intrinsic first order target). Note that all targets, (within the bounds of accuracy) lie beneath this theoretical line. That is they are richer in short time constant components than would be predicted from purely first order targets given the long and medium time constant channel data. In other words, all targets, can strictly only be accurately represented by a time constant continuum. The time values given on the horizontal axis of FIG. 3 in addition to the logarithm of a radio indicate the time constants of the corresponding first order object.

Except for the long time constant non-ferrous targets the non-ferrous targets give responses not too different to the theoretical value. In fact the response from the brass nut is most accurate as it nearly resembles a resistive inductor. However, all metal targets display high order terms. In non-ferrous targets the short time constant higher order terms are most noticeable when the dominant first order time constants are comparable or longer than the longer transmit pulse period which therefore results in the deviation from the first order theoretical response.

The ferrous targets give predominantly substantially different results to the theoretical value, typically by a factor of 3–6 times. More importantly, the difference in response between the non-ferrous targets and ferrous targets is typically between 50 and 400%. The exceptions to this are small ferrous targets that are very long compared to wide (nails and paper clips etc). This is because these contain one very dominant homogeneous eddy current path; viz, circulating about the central axis, therefore there is mainly one dominant time constant. In the results illustrated in FIG. 3 the worst cases measured between ferrous targets which are most like first order targets and non-ferrous targets which are least like first order targets are shown. These are for a thin drill bit which differed by about 30% compared to coins of similar time constants, a paper clip which differed by only 10%, a nail which differed by 15% and another nail which differed by 30%.

Thus in practice a critical threshold is set for each measured set of ratios, to determine whether the targets are ferrous are non-ferrous. This threshold can lie approximately half way between the geometric mean of the border between the non-ferrous targets which are least first order like, and the ferrous targets which are the most first order like. This is preferably achieved by a microprocessor which consults a look-up table derived from empirical data such as that presented in FIG. 3.

The above relates to pulse induction, however the same principles can be used with continuous transmission. For example in another form of this invention two frequencies are transmitted, say $w1$ and $w2$, at 5 and 40 kHz respectively, then 3 averaged ground balanced signals can be obtained. These are $w1$ and $w2$ resistive signals and a balanced reactive difference signal ($w1$ reactive $-w2$ reactive). For a first order object with time constant $L/R$ the respective ratios of (equally amplified) components are:

$w1\ \text{resistive}=w*w1/(w1*w1+w*w)$ $w2\ \text{resistive}=w*w2/(w2*w2+w*w)$ reactive difference signal$=2/\pi\log(w2-w1)*w2*w2/(w2*w2+w*w)-w1*w1/(w1*w1+w*w)$ where w is the reciprocal time constant of an ideal first order target In another form of this invention the transmit signal consists of a multi-period rectangular continuous waveform such that 3 averaged ground balanced channels may be obtained, one associated with high frequencies owing to sampling shortly after transmit voltage transitions balanced with samples taken a short while later, and better still where the set(s) of samples are taken after short period pulses. Another may be associated with low frequencies owing to sampling after a delay after transmit voltage transitions following long period pulses balanced with samples taken near the end of long period pulses. A third averaged ground balanced channel may be obtained to yield a mid-frequency response by sampling near the beginning of voltage transitions following medium pulse periods balanced against samples near the end of medium pulse periods, or alternatively by sampling shortly after transmit voltage transitions at the end of long transmit periods balanced with samples taken near the end of long period pulses. Again ratios of these averaged ground balanced signals may be compared in inequalities determined from first order equations which depend on the transmit coil time constant, the transmit period sequences and when the samples are taken, to determine the ferrous or non-ferrous composition of the target. Pulse induction techniques give a far bigger ferrous to non-ferrous target difference than rectangular continuous waveforms or continuous transmission of at least two frequencies. This is due to the very exaggerated high frequency response following the rapid transmit coil magnetic discharge to short time constant components. In addition, so long as just a few microseconds are allowed to elapse following transmit voltage transitions, the eddy currents in conductive ground such as salt water will have decayed away to insignificant levels and therefore not cause background interference. If further, the transmit signal consists of multi-period sequences of either a rectangular or pulse induction waveform, then the received samples obtained to give averaged ground balanced channels during short period transmit signals may be best used to assess fast time constant targets and the received samples obtained to give averaged ground balanced channels during long period transmit signals may be best used to assess conductive slow time constant targets. The choice to use signals obtained from the long or short periods maybe determined by the stronger of the two signals.

Figure 4:
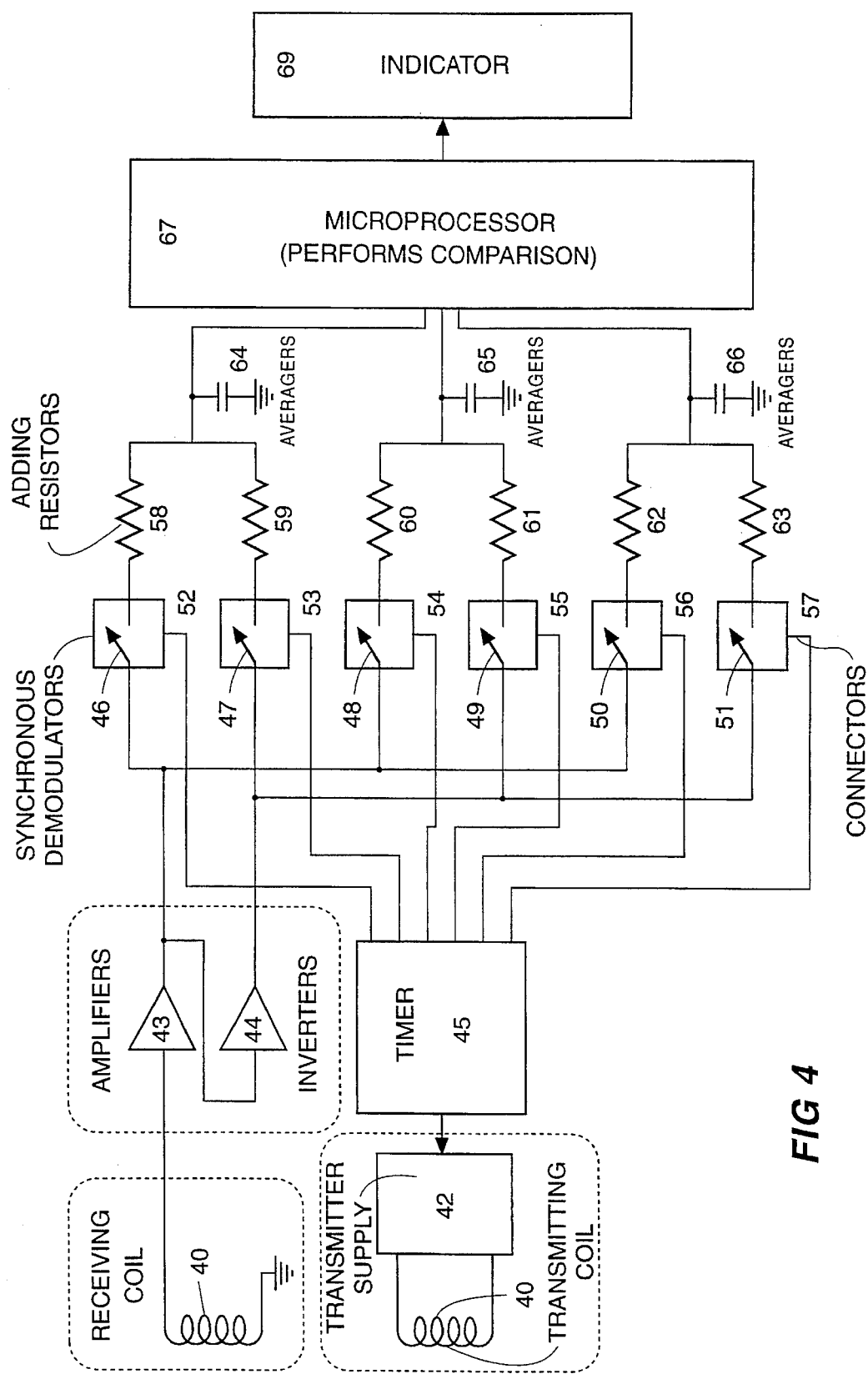
FIG. 4 shows a block diagram of the characteristic working of the device and method of the invention.

FIG. 4 shows a preferred embodiment of the invention which also serves to illustrate the characteristic workings of the invention where an electrical supply 42 supplies a varying voltage to a transmitter coil 41 which is used to illuminate a volume of ground with a pulsed magnetic field. The timing of these pulses is determined by the timer 45. The volume of ground which may contain ferrous and/or non-ferrous metals produces a second magnetic field which is detected by receiving coil 40. Changes in the second magnetic field induce a voltage signal in the receiving coil. This voltage signal is amplified by the amplifier 43 and the output from that amplifier is inverted by the inverting amplifier 44.

The non inverted output of the amplifier 43 is further connected to the inputs of three synchronous demodulators 46, 48 and 50. The output of the inverter 44 is connected to the inputs of three other synchronous demodulators 47, 49 and 51. As can be seen in FIG. 4, these six synchronous demodulators are switches, such as transistors, whose states are controlled by the timer 45;

the states of switches of 46, 47, 48, 49, 50 and 51 are controlled by the timer via the connections 52, 53, 54, 55, 56 and 57 respectively.

The timing of the switching operation is indicated by the graphs, or timing diagrams, 23 to 28 of FIG. 2. Each graph shows typical timing of one of the switches 46 to 51. When the graph line is high, the switch whose timing it represents is closed or "on";

when the graph line is low, the switch whose timing it illustrates is open, or "off". Each switch is opened and closed as per only one of the timing diagrams 23 to 28.

The synchronous demodulator 46 is controlled as per the timing diagram 23 via the connection 52;

the synchronous demodulator 47 is controlled as per the timing diagram 24 via the connection 53;

the synchronous demodulator 48 is controlled as per the timing diagram 25 via the connection 54;

the synchronous demodulator 49 is controlled as per the timing diagram 28 via the connection 55;

the synchronous demodulator 50 is controlled as per the timing diagram 26 via the connection 56;

the synchronous demodulator 51 in controlled as per the timing diagram 27 via the connection 57.

None of the periods during which the received signal is sampled is during a period of transmission of a magnetic field by the transmitting coil 41, so all of the sample signals are substantially ground balanced.

The ways in which the sampled signals are combined and averaged has already been described in this application, but the following is with specific reference to FIG. 4.

The pair of sampled signals and the outputs of synchronous demodulators 46 and 47 are combined in a linear combination in proportions determined by the values of the resistors 58 and 59, than averaged by the signal averager 64, normally a capacitor. The values of resistors 58 to 59 are chosen so that the resultant average signal is derived principally from those components of the received signal which have medium time constants. The average signal at 64 would be called the medium time constant channel.

The pair of sampled signals and the outputs of synchronous demodulators 48 and 49 are combined in a linear combination in proportions determined by the values of the resistors 60 and 61, than averaged by the signal averager 65. The values of resistors 60 to 61 are chosen so that the resultant average signal is derived principally from those components of the received signal which have long time constants. The average signal at 65 will be called the long time constant channel.

The pair of sampled signals at the outputs of synchronous demodulators 50 and 51 are combined in a linear combination in proportions determined by the values of the resistors 62 and 63 then averaged by the signal averager 66. The values of resistors 62 to 63 are chosen so that the resultant average signal is derived principally from those components of the received signal which have short time constants. The average signal at 66 will be called the short time constant channel.

The time constant of the signal averagers is at least several times the duration of one cycle of transmitted pulses from the coil 41.

Each of the channels from the averagers 64 to 66 is directed to a microprocessor 67. The microprocessor then performs calculations using the values of the three channels to produce two numbers. The first number is calculated by taking the natural logarithm of the ratio of the values of the long time constant and the medium time constant channels. The second number is calculated by taking the natural logarithm of the ratio of the values of the short time constant and the medium time constant channels. These two numbers can be imagined as a pair of co-ordinates on a graph, similar to that shown in FIG. 3. The values of many pairs of co-ordinates similar to the points shown in FIG. 3 can be stored in the microprocessor in a look-up table based upon known non-ferrous and ferrous objects. The calculated pair of co-ordinates can then be compared to those stored in the microprocessor and a signal sent to the indicator 69 to indicate that the detected object is of a non-ferrous or ferrous type whose closest co-ordinates are stored in the microprocessor. Alternatively the values of many pairs of co-ordinates are determined by distinguishing between ferrous and non-ferrous objects and may be used to calculate an empirical function, the calculated pair of co-ordinates then compared to that function to indicate whether or not the detected object is ferrous or nonferrous. In addition, it may be further possible to predict what type of ferrous or non-ferrous object the detected object may be by comparing the calculated pair of co-ordinates to those stored in the microprocessor for known ferrous or non-ferrous objects.

I claim:

1. A metal detector for detecting and discriminating between ferrous and non-ferrous metal targets in ground, said detector comprising:

transmission means for providing a first varying magnetic field to a desired volume of ground the said first varying magnetic field containing at least two components, where each said component varies at a frequency different from the frequency of variation of every other said component;

receiving means for providing an output voltage substantially dependent upon a second magnetic field emanating from within the desired volume of ground;

means for sampling at least three voltage measurements of the output voltage over at least three voltage measurements of the output voltage over at least three separate periods of sampling to provide at least three sampled values, the periods of sampling being synchronised with the first varying magnetic field;

means for processing the at least three sampled values to provide at least three averaged ground balanced signals and further adapted to provide at least two ratios from the at least three averaged ground balanced signals;

comparison means for providing at least one comparison signal determined by comparing the at least two ratios to pre-determined ratios which have previously been determined for various metal targets, which is an indicating means adapted to provide an indicating signal, derived from the at least one comparison signal which indicates the presence of non-ferrous metal within the desired volume of ground.

2. A metal detector as in claim 1 in which the comparison means compares the at least one pair of ratios to the values of the known pairs of ratios, wherein the values of the known pairs of ratios are within a selected range of values of pairs of ratios whose ranges correspond to the presence of first order objects within the ground and the presence of no conducting metal objects within the desired volume of ground.

3. A metal detector for detecting and discriminating between ferrous and non-ferrous metal targets in ground, the metal detector comprising:

an electrical supply for providing a voltage to a means of transmitting magnetic fields, the electrical supply providing a first substantially abrupt transition from a zero voltage to a substantially steady state non-zero voltage which is maintained for a finite duration, termed a transmission period, after which the electrical supply substantially abruptly removes the substantially steady state voltage from the means of transmitting magnetic fields and in doing so provides a resultant back electromotive force to the means of transmitting magnetic fields which then transmits a first varying magnetic field to a desired volume of ground;

receiver means for providing a received voltage signal dependent on a second magnetic field emanating from within the desired volume of ground;

means for sampling at least three voltage measurements of the received voltage signal over at least three separate time periods to provide at least three sampled values, the periods of sampling being synchronised with the first varying magnetic field;

means for processing the at least three sampled values to provide at least three averaged ground balanced signals and further for providing at least two ratios from the at least three averaged ground balanced signals;

comparison means for providing at least one comparison signal determined by comparing the at least two ratios to known ratios corresponding to different types of ferrous and non-ferrous metal targets; and an indicating means for providing an indicating signal, derived from the at least one comparison signal, indicative of the presence of non-ferrous metal within the desired volume of ground.

4. A metal detector as in claim 3, in which the at least three separate time periods occur during periods of substantially no transmission of magnetic fields by the means of transmitting magnetic fields.

5. A metal detector as in claim 4 in which the durations of at least one of the transmission periods providing a substantially steady state voltage to the means of transmitting magnetic fields shall be different to the durations of at least one other of the transmission periods and the durations and commencements of the at least three sampling periods are so arranged with respect to the at least two transmission periods that of the at least three averaged ground balanced signals, at least one averaged ground balanced signal consists substantially of relatively low frequency components of the received voltage signal, at least one other averaged ground balanced signal consists substantially of relatively high frequency components of the received voltage signal and at least one other averaged ground balanced signal consists substantially of components of the received voltage signal whose frequencies lie between the frequencies of the said relatively high frequency components of the received signal and the frequencies of the said relatively low frequency components of the received signal.

6. A metal detector as in claim 4 in which the durations of at least one of the transmission periods providing a substantially steady state voltage to the means of transmitting magnetic fields shall be different to the durations of at least one other of the transmission periods and the durations and commencements of the at least three sampling periods are so arranged with respect to the at least two transmission periods that of the at least three averaged ground balanced signals, at least one averaged ground balanced signal consists substantially of relatively low frequency components of the received voltage signal, at least one other averaged ground balanced signal consists substantially of relatively high frequency components of the received voltage signal and at least one other averaged ground balanced signal consists substantially of components of the received voltage signal whose frequencies lie between the frequencies of the said relatively high frequency components of the received signal and the frequencies of the said relatively low frequency components of the received signal.

7. A method of detecting and discriminating between ferrous and non-ferrous metal targets buried in a volume of ground including the steps of:

supplying transmitting a first varying magnetic field to the desired volume of ground, the first varying magnetic field containing at least two components, where each said component varies at a frequency different from the frequency of variation of every other said component;

receiving a signal from a second magnetic field emanating from within the desired volume of ground and providing a received voltage signal;

sampling at least three voltage measurements of the received voltage signal over at least three voltage measurements of the received voltage signal over at least three separate periods of sampling to provide at least three sampled values, the periods of sampling being synchronised with the first varying magnetic field;

processing the at least three sampled values to provide at least three averaged ground balanced signals and further adapted to provide at least two ratios from the at least three averaged ground balanced signals;

comparing the at least two ratios to pre-determined ratios, which previously have been determined for various metal targets, and providing a comparison signal, which is used to indicate the presence of metal targets within the desired volume of ground and is further used to distinguish between ferrous and non-ferrous metal targets within the volume of ground.

8. A method of detecting and discriminating between ferrous and non-ferrous metal targets in a desired volume of ground as in claim 7 in which, in the comparison of the at least one pair of ratios to the values of the known pairs of ratios, the values of the known pairs of ratios are within a selected range of values of pairs of ratios whose ranges correspond to the presence of first order objects within the ground and the presence of no conducting metal objects within the desired volume of ground.

9. A method of detecting and discriminating between ferrous and non-ferrous metal targets in a desired volume of ground, including the steps of:

supplying a voltage to a means of transmitting magnetic fields, a first substantially abrupt transition from a zero voltage to a substantially steady state non-zero voltage which is maintained for a finite duration, termed a transmission period, after which the electrical supply substantially abruptly removes the substantially steady state voltage from the means of transmitting magnetic fields and in doing so provides a resultant back electromotive force to the means of transmitting magnetic fields which then transmits a first varying magnetic field to a desired volume of ground;

receiving a signal from a second magnetic field emanating from within the desired volume of ground and providing a received voltage signal;

sampling at least three voltage measurements of the received voltage signal over at least three voltage measurements of the received voltage signal over at least three separate periods of sampling to provide at least three sampled values, the periods of sampling being synchronised with the first varying magnetic field;

processing the at least three sampled values to provide at least three averaged ground balanced signals and further adapted to provide at least two ratios from the at least three averaged ground balanced signals; and comparing the at least two ratios to pre-determined ratios, which previously have been determined for various metal targets, and providing a comparison signal, which is used to indicate the presence of metal targets within the desired volume of ground and is further used to distinguish between ferrous and non-ferrous metal targets within the volume of ground.

10. A method of detecting and discriminating between ferrous and non-ferrous metal targets in a desired volume of ground as in claim 9 in which the at least three separate time periods occur during periods of substantially no transmission of magnetic fields by the means of transmitting magnetic fields.

11. A method of detecting and discriminating between ferrous and non-ferrous metal targets in a desired volume of ground as in claim 9 in which the durations of at least one of the transmission periods providing a substantially steady state voltage to the means of transmitting magnetic fields shall be different to the durations of at least one other of the transmission periods and the durations and commencements of the at least three sampling periods are so arranged with respect to the at least two transmission periods that of the at least three averaged ground balanced signals, at least one averaged ground balanced signal consists substantially of relatively low frequency components of the received voltage signal, at least one other averaged ground balanced signal consists substantially of relatively high frequency components of the received voltage signal and at least one other averaged ground balanced signal consists substantially of components of the received voltage signal whose frequencies lie between the frequencies of the said relatively high frequency components of the received signal and the frequencies of the said relatively low frequency components of the received signal.

12. A method of detecting and discriminating between ferrous and non-ferrous metal targets in a desired volume of ground as in claim 10 in which the durations of at least one of the transmission periods providing a substantially steady state voltage to the means of transmitting magnetic fields shall be different to the durations of at least one other of the transmission periods and the durations and commencements of the at least three sampling periods are so arranged with respect to the at least two transmission periods that of the at least three averaged ground balanced signals, at least one averaged ground balanced signal consists substantially of relatively low frequency components of the received voltage signal, at least one other averaged ground balanced signal consists substantially of relatively high frequency components of the received voltage signal and at least one other averaged ground balanced signal consists substantially of components of the received voltage signal whose frequencies lie between the frequencies of the said relatively high frequency components of the received signal and the frequencies of the said relatively low frequency components of the received signal.

* * * * *